United States Patent
Bock et al.

(10) Patent No.: US 10,138,956 B1
(45) Date of Patent: Nov. 27, 2018

(54) SYSTEM AND METHOD FOR CONTROLLING A DAMPER BYPASS CLUTCH TO PROVIDE FRICTION DAMPING IN A CONNECTION BETWEEN AN ENGINE AND A TRANSMISSION

(71) Applicant: GM Global Technology Operations LLC, Detroit, MI (US)

(72) Inventors: Peter D. Bock, Commerce Township, MI (US); Randy L. Melanson, Pinckney, MI (US); Michael J. Grimmer, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 15/653,852

(22) Filed: Jul. 19, 2017

(51) Int. Cl.
| | |
|---|---|
| *F16D 48/02* | (2006.01) |
| *F16D 13/52* | (2006.01) |
| *F16D 21/00* | (2006.01) |
| *F16D 48/06* | (2006.01) |

(52) U.S. Cl.
CPC ............ *F16D 48/02* (2013.01); *F16D 13/52* (2013.01); *F16D 21/00* (2013.01); *F16D 48/066* (2013.01); *F16D 2300/22* (2013.01); *F16D 2500/1045* (2013.01); *F16D 2500/10412* (2013.01); *F16D 2500/3067* (2013.01); *F16D 2500/50293* (2013.01)

(58) Field of Classification Search
CPC .... F16D 48/02; F16D 48/066; F16D 2300/22; F16D 2500/3067; F16D 2500/50293
See application file for complete search history.

(56) References Cited

U.S. PATENT DOCUMENTS

| | | | |
|---|---|---|---|
| 8,967,353 B2 | 3/2015 | Roses et al. | |
| 2013/0165240 A1* | 6/2013 | Grimmer | F16F 15/1202 464/68.2 |
| 2014/0100748 A1* | 4/2014 | Kim | B60W 10/023 701/68 |
| 2014/0142824 A1* | 5/2014 | Kim | F16D 48/06 701/68 |
| 2014/0274561 A1* | 9/2014 | Ukon | F16F 15/1478 477/175 |

* cited by examiner

*Primary Examiner* — Edwin A Young (57) ABSTRACT

A system according to the present disclosure includes an engine speed module and a damper control module. The engine speed module is configured to determine a speed of an engine. The damper control module is configured to (i) fully engage a damper bypass clutch of a damper assembly to fully bypass a damper of the damper assembly when the engine is starting and the engine speed is less than a first speed, and (ii) partially engage the damper bypass clutch to partially bypass the damper when the engine speed is greater than or equal to the first speed. The engine is connected to a transmission through the damper when the damper bypass clutch is at least partially disengaged. The damper bypass clutch connects the engine and the transmission to one another independent of the damper when the damper bypass clutch is fully engaged.

20 Claims, 7 Drawing Sheets

SYSTEM AND METHOD FOR CONTROLLING A DAMPER BYPASS CLUTCH TO PROVIDE FRICTION DAMPING IN A CONNECTION BETWEEN AN ENGINE AND A TRANSMISSION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling a damper bypass clutch to provide friction damping in a connection between an engine and a transmission.

In some instances, fluctuations or disturbances in the torque output of the engine are transmitted to a driveline connected to the engine, resulting in driveline disturbances. Thus, some vehicles include a damper that connects an engine to a transmission and reduces the amount of engine torque disturbances that are transmitted to the driveline. The damper typically includes a plurality of coil springs that allow a small amount of relative motion between a component coupled to the engine and a component coupled to the transmission. As the coil springs compress, the coil springs absorb some of the engine torque disturbances.

When an engine is started, the disturbances in the torque output of the engine may approach the natural frequency of the damper. If this occurs, the damper is ineffective at reducing the amount of engine torque disturbances that are transmitted to the driveline, and the damper may oscillate at an amplitude and frequency that causes damage to the damper. Thus, some vehicles include a damper bypass clutch that provides a hard connection between the engine and the transmission, and thereby bypasses the damper, when the damper bypass clutch is engaged. The damper bypass clutch is typically engaged when the engine torque disturbances are likely to be at or near the natural frequency of the damper, such as during engine startups.

SUMMARY

A system according to the present disclosure includes an engine speed module and a damper control module. The engine speed module is configured to determine a speed of an engine. The damper control module is configured to (i) fully engage a damper bypass clutch of a damper assembly to fully bypass a damper of the damper assembly when the engine is starting and the engine speed is less than a first speed, and (ii) partially engage the damper bypass clutch to partially bypass the damper when the engine speed is greater than or equal to the first speed. The engine is connected to a transmission through the damper when the damper bypass clutch is at least partially disengaged. The damper bypass clutch connects the engine and the transmission to one another independent of the damper when the damper bypass clutch is fully engaged.

In one aspect, the damper control module is configured to (i) fully engage the damper bypass clutch by applying a first force to a friction plate of the damper bypass clutch, and (ii) partially engage the damper bypass clutch by applying a second force to the friction plate, where the second force is less than the first force and greater than zero.

In one aspect, the damper control module is configured to supply fluid at a first pressure to a damper piston of the damper bypass clutch to cause the damper piston to apply the first force to the friction plate.

In one aspect, the damper control module is configured to supply fluid at a second pressure to the damper piston of the damper bypass clutch to cause the damper piston to apply the second force to the friction plate, where the second pressure is less than the first pressure.

In one aspect, the second pressure is greater than zero.

In one aspect, the system further includes the damper assembly, the second pressure is equal to zero, and the damper assembly includes an input drive plate connected to the engine, a spring retainer plate connected to the transmission, and a spring that applies a biasing force between the input drive plate and the spring retainer plate to at least partially bypass the damper.

In one aspect, the damper control module is configured to determine the second pressure based on a vehicle operating condition.

In one aspect, the system further includes the damper bypass clutch and a control valve that controls the pressure of fluid supplied to the damper piston of the damper bypass clutch, where the control valve has a first port in fluid communication with a first fluid line at the first pressure, a second port in fluid communication with a second fluid line at the second pressure, and a third port in fluid communication with a fluid supply line that supplies fluid to the damper piston.

In one aspect, the system further includes the damper bypass clutch and a control valve that controls the pressure of fluid supplied to the damper piston of the damper bypass clutch, where the damper control module is configured to control the control valve to adjust the pressure of fluid supplied to the damper piston to N values at N different times, and where N is an integer greater than two.

In one aspect, the damper control module is configured to (i) fully engage the damper bypass clutch when a command to start the engine is generated, and (ii) continue to fully engage the damper bypass clutch while the engine speed is less than the first speed.

A method according to the present disclosure includes determining a speed of an engine, fully engaging a damper bypass clutch of a damper assembly to fully bypass a damper of the damper assembly when the engine is starting and the engine speed is less than a first speed, and partially engaging the damper bypass clutch to partially bypass the damper when the engine speed is greater than or equal to the first speed. The engine is connected to a transmission through the damper when the damper bypass clutch is at least partially disengaged. The damper bypass clutch connects the engine and the transmission to one another independent of the damper when the damper bypass clutch is fully engaged.

In one aspect, the method further includes fully engaging the damper bypass clutch by applying a first force to a friction plate of the damper bypass clutch, and partially engaging the damper bypass clutch by applying a second force to the friction plate, where the second force is less than the first force and greater than zero.

In one aspect, the method further includes supplying fluid at a first pressure to a damper piston of the damper bypass clutch to cause the damper piston to apply the first force to the friction plate.

In one aspect, the method further includes supplying fluid at a second pressure to the damper piston of the damper bypass clutch to cause the damper piston to apply the second force to the friction plate, where the second pressure is less than the first pressure.

In one aspect, the second pressure is greater than zero.

In one aspect, the second pressure is equal to zero, and the damper assembly includes an input drive plate connected to the engine, a spring retainer plate connected to the transmission, and a spring that applies a biasing force between the input drive plate and the spring retainer plate to at least partially bypass the damper.

In one aspect, the method further includes determining the second pressure based on a vehicle operating condition.

In one aspect, the method further includes placing a first fluid line at the first pressure in fluid communication with a fluid supply line for the damper piston at a first time, and placing a second fluid line at the second pressure in fluid communication with the fluid supply line for the damper piston at a second time that is different than the first time.

In one aspect, the method further includes adjusting the pressure of fluid supplied to the damper piston to N values at N different times, where N is an integer greater than two.

In one aspect, the method further includes fully engaging the damper bypass clutch when a command to start the engine is generated, and continuing to fully engage the damper bypass clutch while the engine speed is less than the first speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, some vehicles include a damper that connects a transmission to an engine while damping engine vibration, and a damper bypass clutch that bypasses the damper when the damper bypass clutch is engaged. When the damper bypass clutch is commanded ON, the damper bypass clutch is engaged by supplying hydraulic fluid at a high pressure to the damper bypass clutch. In turn, all of the torque output of the engine is transferred to the transmission through the damper bypass clutch and independent of the damper. When the damper bypass clutch is commanded OFF, the damper bypass clutch is disengaged by decreasing the pressure of hydraulic fluid supplied to the damper bypass clutch to zero. In turn, all of the torque output of the engine is typically transferred to the transmission through the damper.

Also, as discussed above, the damper typically includes a plurality of coil springs that allow a small amount of relative motion between the engine and the transmission, which reduces the amount of vibration transmitted to the driveline. However, the damper provides minimal friction torque or hysteresis torque (e.g., less than 5 Newton-meters (Nm)) when the damper bypass clutch is commanded OFF. This underdamped system may oscillate in response to engine torque disturbances, resulting in undesirable driveline disturbances that are felt by the driver.

A system and method according to the present disclosure addresses this issue by controlling or designing a damper assembly to provide a higher level (e.g., 24 Nm) of friction torque or hysteresis torque when the damper bypass clutch is commanded OFF. In one example, the system and method supplies hydraulic fluid at a low pressure to the damper bypass clutch to only partially engage the damper bypass clutch when the damper bypass clutch is commanded OFF. In turn, most of the engine torque output is transferred to the transmission through the damper, while some of the engine torque output is converted into friction torque at the damper bypass clutch.

In another example, the damper bypass clutch includes a Belleville spring or coil spring pack that applies a constant force to a friction plate stack in the damper bypass clutch. The force applied by the Belleville spring or coil spring pack partially compresses the friction plate stack to generate a friction torque without fully compressing the friction plate stack. Thus, even when the pressure of hydraulic fluid supplied to the damper bypass clutch is set to zero, the damper bypass clutch remains partially engaged due to the force of the Belleville spring or coil spring pack acting on the friction plate stack in the damper bypass clutch.

Figure 1:
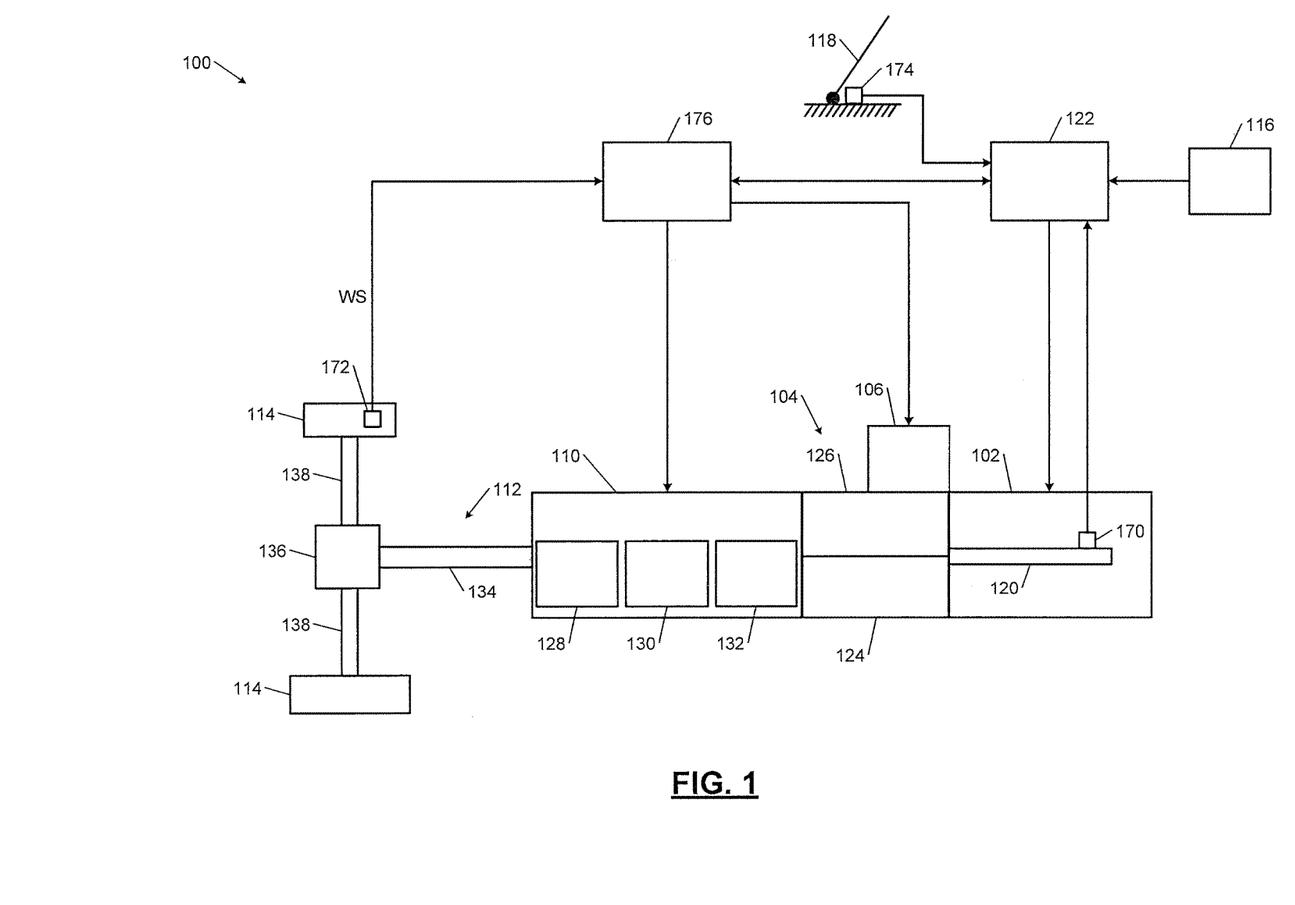
FIG. 1 is a functional block diagram of an example vehicle according to the principles of the present disclosure.

Referring now to FIG. 1, a vehicle 100 includes an engine 102, a damper assembly 104, a clutch control valve 106, a transmission 110, a driveline 112, wheels 114, an ignition switch 116, and an acceleration pedal 118. The engine 102 combusts an air/fuel mixture to produce drive torque for the vehicle 100. The engine 102 includes a crankshaft 120. An engine control module (ECM) 122 adjusts the amount of drive torque produced by the engine 102 based on a driver input such as an accelerator pedal position and/or a cruise control setting.

Engine torque output at the crankshaft 120 is transferred through the damper assembly 104, through the transmission 110, through the driveline 112, and to the wheels 114. The damper assembly 104 includes a damper 124 and a damper bypass clutch 126. The damper 124 transmits torque from the crankshaft 120 of the engine 102 to the transmission 110 while damping or minimizing the amount of vibration transmitted from the engine 102 to the transmission 110.

The damper bypass clutch 126 provides a hard or direct connection between the engine 102 and the transmission 110 when the damper bypass clutch 126 is fully engaged. Thus, the transmission 110 is connected to the engine 102 independent of the damper 124 when the damper bypass clutch 126 is fully engaged. When the damper bypass clutch 126 is at least partially disengaged, the engine torque output is transferred to the transmission 110 through the damper 124. The clutch control valve 106 controls the pressure of hydraulic fluid supplied to the damper bypass clutch 126 to engage or disengage the damper bypass clutch 126.

The transmission 110 transfers torque from the damper assembly 104 to the driveline 112 while multiplying the torque by one or more gear ratios. The transmission 110 includes an electric motor 128, one or more gears 130, and a transmission clutch 132. The electric motor 128 produces drive torque for the vehicle 100 when the engine 102 is shutoff and/or to supplement the drive torque produced by the engine 102. In addition the electric motor 128 may drive the engine 102 to crank and start the engine 102. Since the transmission 110 includes the electric motor 128, the transmission 110 may be a hybrid transmission, and the vehicle 100 may be a hybrid vehicle. In various implementations, the electric motor 128 may be omitted, and the vehicle 100 may be propelled by the engine 102 alone.

Each of the gears 130 multiplies the torque transferred from the engine 102 to the driveline 112 through a unique gear ratio when the corresponding one of the gears 130 is engaged. The transmission clutch 132 decouples the transmission 110 from the engine 102 when the transmission clutch 132 is engaged. The transmission clutch 132 couples the transmission 110 to the engine 102 when the transmission clutch 132 is disengaged. Engaging the transmission clutch 132 enables switching between the gears 130 of the transmission 110 (i.e., engaging one of the gears 130 and engaging another one of the gears 130).

The driveline 112 includes a drive shaft 134, a differential 136, and axle shafts 138. The drive shaft 134 and the differential 136 transfer torque from the transmission 110 to the axle shafts 138. The axle shafts 138 rotate the wheels 114, which causes the vehicle 100 to accelerate in a forward or rearward direction.

The vehicle 100 also includes various sensors that measure operating conditions of the vehicle 100. A crankshaft position (CKP) sensor 170 is mounted proximate to the crankshaft 120 and measures the angular position of the crankshaft 120. A wheel speed (WS) sensor 172 is mounted to one or more of the wheels 114 and measures the speed of the wheels 114 (or the speed of the vehicle 100). An accelerator pedal position (APP) sensor 174 measures the position of the accelerator pedal 118.

A transmission control module (TCM) 176 shifts gears of the transmission 110 based on operating conditions of the vehicle 100 and a predetermined shift schedule. The operating conditions may include the speed of the vehicle 100, a desired acceleration of the vehicle 100, and/or a desired torque output of the engine 122. The TCM 176 may determine the vehicle speed based on the wheel speed from the WS sensor 172. The TCM 176 may receive the desired vehicle acceleration and/or the desired engine torque from the ECM 122. The ECM 122 may communicate with the TCM 176 to coordinate shifting gears in the transmission 110. For example, the ECM 122 may reduce engine torque during a gear shift.

The TCM 176 also adjusts the position of the control clutch valve 106 to control the pressure of hydraulic fluid supplied to the damper bypass clutch 126 in order to engage or disengage the damper bypass clutch 126. The TCM 176 adjusts the pressure of the hydraulic fluid to a first pressure (e.g., a pressure from 180 kilopascals (kPa) to 1030 kPa) to fully engage the damper bypass clutch 126. When the damper bypass clutch 126 is fully engaged, all of the engine torque output is transmitted to the transmission 110 through the damper bypass clutch 126. Thus, in this state, the damper bypass clutch 126 bypasses the damper 124.

The TCM 176 adjusts the pressure of the hydraulic fluid to a second pressure (e.g., a pressure from 130 kPa to 148 kPa) to partially engage the damper bypass clutch 126. The second pressure is less than the first pressure and, when the TCM 176 supplies hydraulic fluid at the second pressure to partially engage the damper bypass clutch 126, the second pressure is greater than zero. The first pressure and/or the second pressure may be predetermined. When the damper bypass clutch 126 is partially engaged, some (e.g., most) of the engine torque output is transferred to the transmission 110 through the damper 124. In this state, the damper 124 reduces the amount of vibration transmitted from the engine 102 to the transmission 110. In addition, the damper bypass clutch 126 produces a friction or drag force which provides hysteresis or coulomb damping to further reduce the amount of vibration transmitted from the engine 102 the transmission 110.

The TCM 176 fully engages the damper bypass clutch 126 when the engine 102 is starting (e.g., cranking) and the speed of the engine 102 is less than a first speed (e.g., 400 revolutions per minute (RPM)). The TCM 176 only partially engages the damper bypass clutch 126 when the engine speed is greater than the first speed. The first speed may be predetermined.

Figure 2:
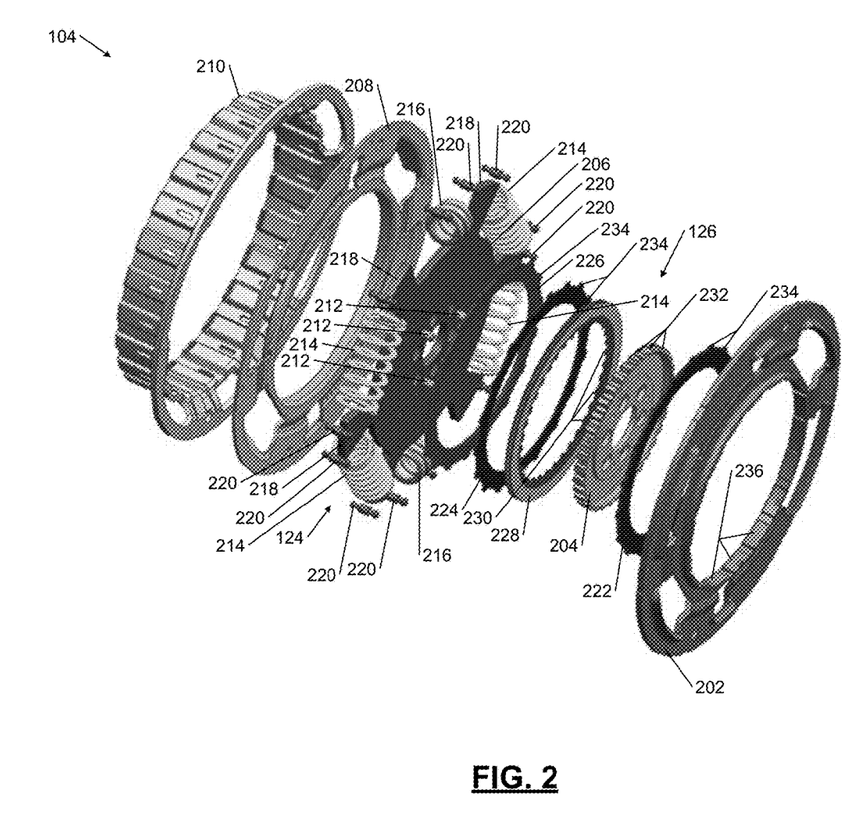
FIG. 2 is an exploded perspective view of an example damper assembly according to the principles of the present disclosure.
Figure 3:
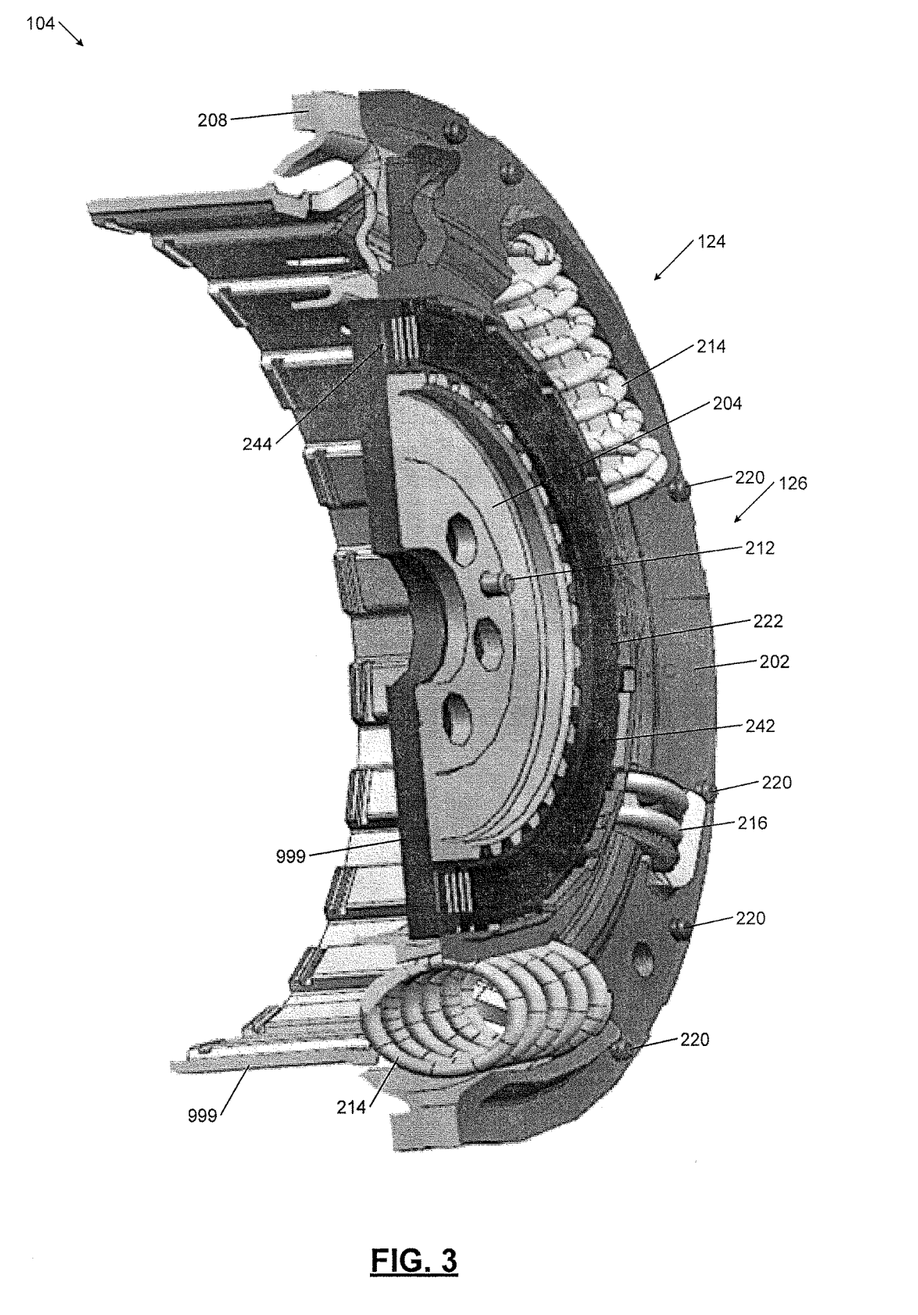
FIG. 3 is a sectioned perspective view of the damper assembly of FIG. 2.
Figure 4:
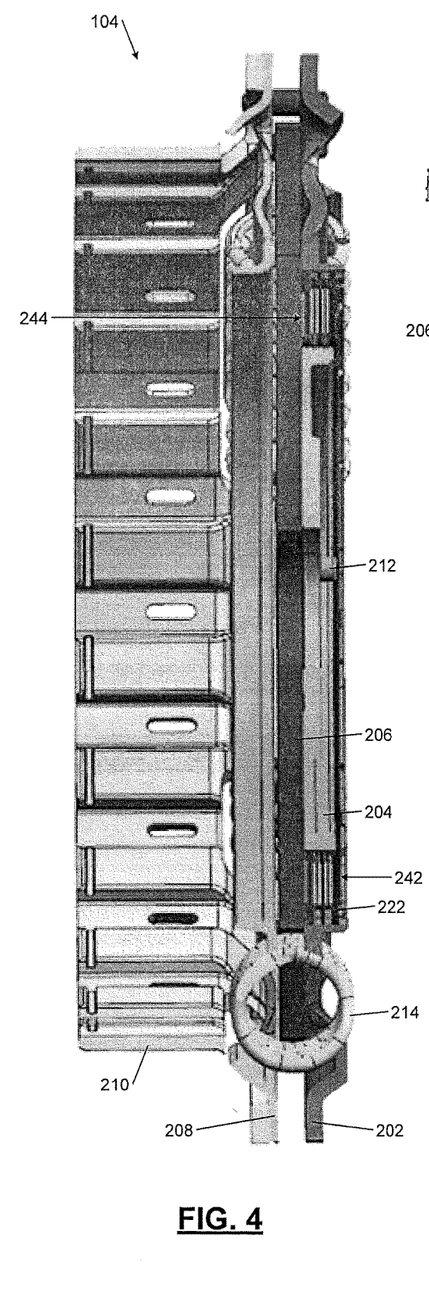
FIG. 4 is a cross-sectional view of the damper assembly of FIG. 2.

Referring now to FIGS. 2-4, an example implementation of the damper assembly 104 includes the damper 124, the damper bypass clutch 126, a first spring retainer plate 202, an input hub 204, an input drive plate 206, a second spring retainer plate 208, and an input clutch housing 210. The input drive plate 206 is connected to a flywheel (not shown) of the engine 102 (FIG. 1). The input hub 204 is rotationally fixed to the input drive plate 206 using pins 212 such that the input hub 204 rotates with the input drive plate 206.

The damper 124 transfer engine torque output from the input drive plate 206 to the spring retainer plates 202, 208 and to the input clutch housing 210. The input clutch housing 210 is coupled (e.g., bolted) to the transmission 110 (FIG. 1). The damper 124 includes first coil springs 214 and second coil springs 216. The second coil springs 216 may have a different rate and/or a different length than the first coil springs 214. The spring retainer plates 202, 208 retain the coil springs 214, 216 between radially extending arms 218 on the input drive plate 206. The first and second spring retainer plates 202 and 208 are riveted to each other and to the input clutch housing 120 using rivets 220.

The coil springs 214, 216 transfer torque from the input drive plate 206 to the spring retainer plates 202, 208. As the coil springs 214, 216 transfer torque from the input drive plate 206 to the spring retainer plates 202, 208. The coil springs 214, 216 compress and relax, which allows some relative angular motion between the input drive plate 206 and the spring retainer plates 202, 208 and thereby dampens engine vibrations. However, the coil springs 214, 216 generate minimal torsional friction or hysteresis torque (e.g., less than 5 Nm).

The damper bypass clutch 126 includes a first friction plate 222, a second friction plate 224, a third friction plate 226, and a reaction plate 228. The friction plates 222, 224, 226 and the reaction plate 228 may be referred to collectively as a friction plate stack. The reaction plate 228 is splined to the input drive plate 206 via inner teeth 230 on the reaction plate 228 that engage outer teeth 232 on the input hub 204. The friction plates 222, 224, 226 are splined to the spring retainer plates 202, 208 and to the input clutch housing 210 via outer teeth 234 on the friction plates 222, 224, 226 that engage inner teeth 236 on the first spring retainer plate 202.

To fully engage the damper bypass clutch 126, a damper piston 240 (FIG. 6) applies a first force to a major surface 242 (FIGS. 3 and 4) of the first friction plate 222. In turn, the friction plate stack in the damper bypass clutch 126 compresses such that all of the engine torque output is transferred to the transmission 110 (FIG. 1) through the damper bypass clutch 126 and independent of the damper 124. The damper piston 240 applies the first force when the clutch control valve 106 (FIG. 1) supplies hydraulic fluid at the first pressure to the damper bypass clutch 126.

To partially engage the damper bypass clutch 126, the damper piston 240 applies a second force to the major surface 242 of the first friction plate 222. In turn, the friction plate stack partially decompresses such that some (e.g., most) of the engine torque output is transferred to the transmission 110 through the damper 124. In this state, the damper bypass clutch 126 applies a friction torque at an interface 244 (FIGS. 3 and 4) between the third friction plate 226 and the input drive plate 206. This friction torque provides hysteresis or coulomb damping that further reduces the amount of vibration transmitted from the engine 102 to the transmission 110. The damper piston 240 applies the second force when the clutch control valve 106 (FIG. 1) supplies hydraulic fluid at the second pressure to the damper bypass clutch 126. The second force is less than the first force and, when the damper piston 240 applies the second force to partially engage the damper bypass clutch 126, the second force is greater than zero.

Figure 5:
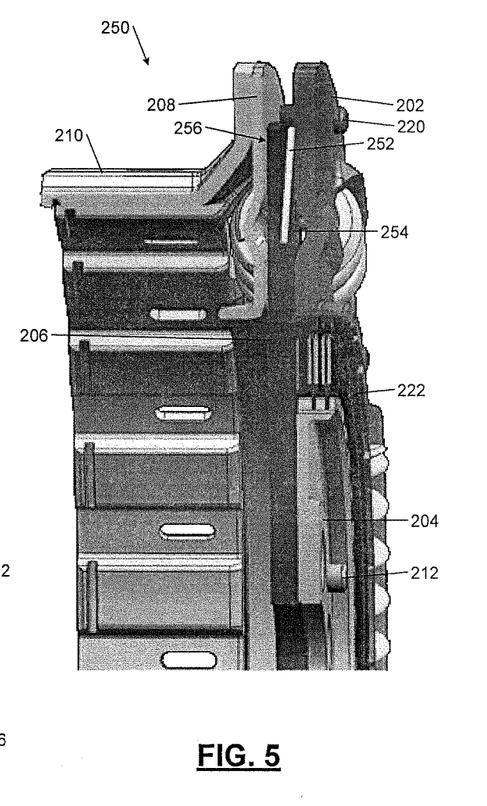
FIG. 5 is a cross-sectional view of a damper assembly similar to the damper assembly of FIG. 2 except that the damper assembly of FIG. 5 includes a Belleville spring biasing an input drive plate toward one of two spring retainer plates.

Referring now to FIG. 5, another example damper assembly 250 is shown. The damper assembly 250 is substantially similar or identical to the damper assembly 108 except that the damper assembly 250 and includes a Belleville spring 252, and the input drive plate 206 defines a pocket 254 that accommodates the Belleville spring 252. The Belleville spring 252 applies a constant biasing force to the input drive plate 206 to bias the input drive plate 206 toward the second spring retainer plate 208. In various implementations, a coil spring pack (not shown) may be used in place of the Belleville spring 252.

The biasing force of the Belleville spring 252 generates a friction torque at an interface 256 between the input drive plate 206 and the second spring retainer plate 208. The friction torque generated by the Belleville spring 252 is similar in magnitude to the friction torque generated by the damper bypass clutch 226 when the damper bypass clutch 226 is partially engaged. Thus, the friction torque generated by the Belleville spring 252 provides hysteresis or coulomb damping equivalent to that provided by partially engaging the damper bypass clutch 226. Therefore, the TCM 176 (FIG. 1) may fully disengage the damper bypass clutch 226 of the damper assembly 250 instead of partially disengaging the damper bypass clutch 226 of the damper assembly 250. In other words, the TCM 176 may control the clutch control valve 106 (FIG. 1) to set the second pressure (and the second force) to zero since the damper assembly 250 includes the Belleville spring 252.

Figure 6:
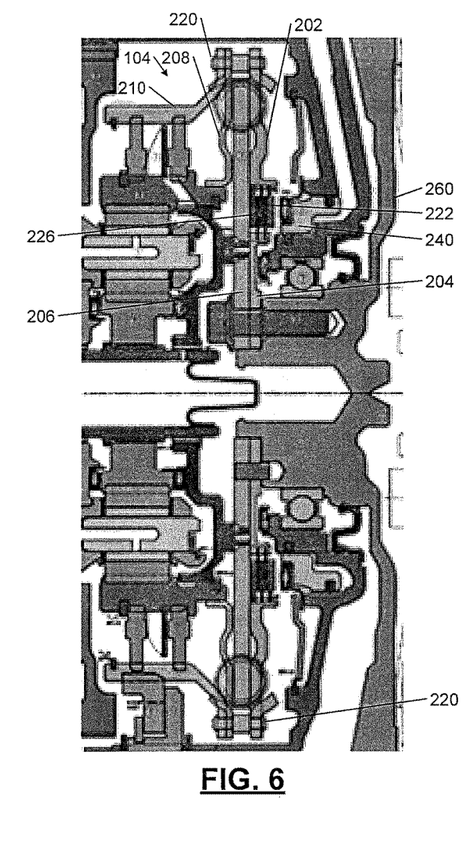
FIG. 6 is another cross-sectional view of the damper assembly of FIG. 2.

Referring now to FIG. 6, the damper assembly 104 is shown along with the damper piston 240 and an input spindle assembly 260. The input spindle assembly 260 connects the flywheel of the engine 102 (FIG. 1) to the input drive plate 206. Although the damper piston 240 and the input spindle assembly 260 are shown in conjunction with the damper assembly 104, the damper piston 240 and the input spindle assembly 260 may also be used with the damper assembly 250.

Figure 7:
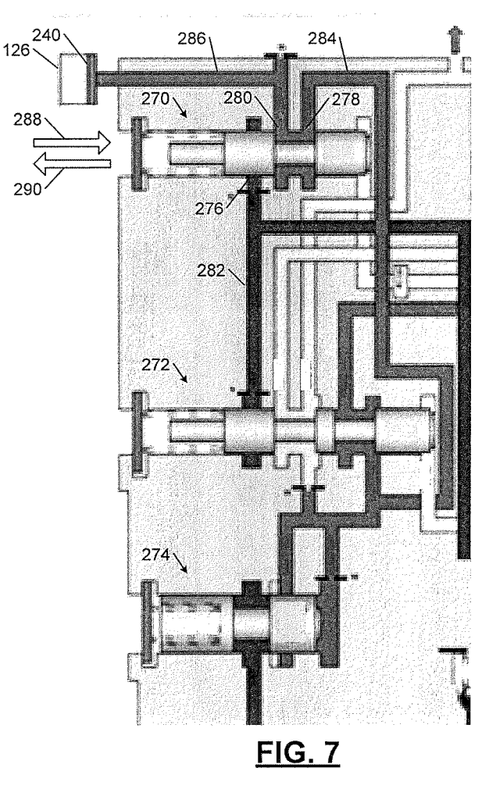
FIG. 7 is a schematic view of an example clutch control valve according to the principles of the present disclosure.

Referring now to FIG. 7, an example implementation of the clutch control valve 106 includes a damper bypass clutch valve 270, a transmission clutch valve 272, and a second pressure regulation valve 274. The damper bypass clutch valve 270 regulates the pressure of hydraulic fluid supplied to the damper bypass clutch 126. The damper bypass clutch valve 270 has a first port 276, a second port 278, and a third port 280. The first port 276 is in fluid communication with a first fluid line 282 containing hydraulic fluid at the first pressure. The second port 278 is in fluid communication with a second fluid line 284 containing hydraulic fluid at the second pressure. The third port 280 is in fluid communication with a fluid supply line 286 that supplies hydraulic fluid to the damper piston 240.

The damper bypass clutch valve 270 includes a valve piston 276 that is moveable between a first position (not shown) and a second position (shown in FIG. 7). The valve piston 276 moves in a first direction 288 to switch from the first position to the second position. The valve piston 276 moves in a second direction 290 opposite of the first direction 280 to switch from the second position to the first position. In the first position, the valve piston 276 places the first port 276 in fluid communication with the third port 280, and thereby places the first fluid line 282 in fluid communication with the fluid supply line 286. In the second position, the valve piston 276 places the second port 280 in fluid communication with the third port 280, and thereby places the second fluid line 284 in fluid communication with the fluid supply line 286.

The transmission clutch valve 272 regulates the pressure of hydraulic fluid supplied to the transmission clutch 132 of the transmission 111. The second pressure regulation valve 274 regulates the pressure of hydraulic fluid contained in the second fluid line 284. In one example, the second pressure regulation valve 274 maintains the pressure of hydraulic fluid contained in the second fluid line 284 at the second pressure (e.g., at a constant pressure that is less than the first pressure and greater than zero). In another example, the second pressure regulation valve 274 adjusts the second pressure to one of a plurality of values (e.g., greater than two values) based on an instruction received from the TCM 176. The TCM 176 may adjust the second pressure based on vehicle operating conditions such as engine speed and/or vehicle speed.

Figure 8:
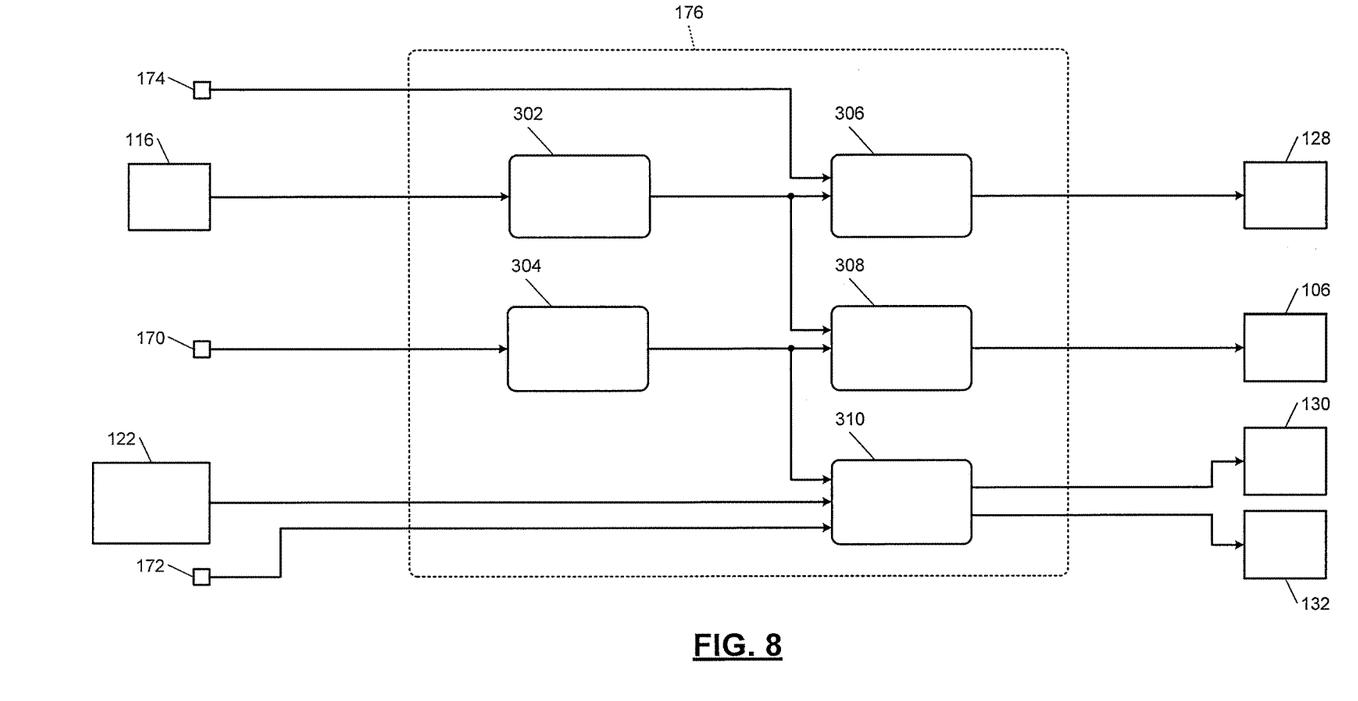
FIG. 8 is a functional block diagram of an example transmission control system according to the principles of the present disclosure.

Referring now to FIG. 8, an example implementation of the TCM 176 includes an engine start module 302, an engine speed module 304, a motor control module 306, a damper control module 308, and a shift control module 310. The engine start module 302 determines whether a command to start the engine 102 is generated and/or whether the engine 102 is starting. The engine start module 302 may determine that the command to start the engine 102 is generated when the ignition switch 116 is adjusted from an OFF position to an ON position. The engine start module 302 may determine that the engine 102 is starting when the engine start command is generated and the speed of the engine 102 is less than the first speed. The engine start module 302 outputs a signal indicating whether the command to start the engine 102 is generated and/or whether the engine 102 is starting.

The engine speed module 304 determines the speed of the engine 102 based on the crankshaft position from the CKP sensor 170. For example, the engine speed module 304 may calculate the engine speed based on a period that elapses as the crankshaft completes one or more revolutions. The engine speed module 304 outputs the engine speed.

The motor control module 306 controls the electric motor 128 of the transmission 110. In one example, the motor control module 306 controls the electric motor 128 to crank and start the engine 102 when the command to start the engine 102 is generated. In another example, the motor control module 306 controls the electric motor 128 to at least partially satisfy a vehicle acceleration demand indicated by the accelerator pedal position from the APP sensor 174.

The damper control module 308 controls the clutch control valve 106 to fully engage the damper bypass clutch 126, partially engage the damper bypass clutch 126, and/or fully disengage the damper bypass clutch 126. The damper control module 308 controls the clutch control valve 106 by outputting a control signal to the clutch control valve 106. The control signal indicates a desired position of the clutch control valve 106. In one example, the damper control module 308 fully engages the damper bypass clutch 126 when the engine 102 is starting and the engine speed is less than the first speed. The damper control module 308 then partially disengages (or partially engages) the damper bypass clutch 126 when the engine speed is greater than or equal to the first speed.

The damper control module 308 fully engages the damper bypass clutch 126 by controlling the clutch control valve 106 to supply hydraulic fluid at the first pressure to the damper piston 240 (FIG. 6) of the damper bypass clutch 126. In turn, the damper piston 240 applies the first force to the friction plate stack of the damper bypass clutch 126. The damper control module 308 partially engages the damper bypass clutch 126 by controlling the clutch control valve 106 to supply hydraulic fluid at the second pressure to the damper piston 240 of the damper bypass clutch 126. In turn, the damper piston 240 applies the second force to the friction plate stack of the damper bypass clutch 126.

The second pressure may be a predetermined pressure having a constant value (e.g., a value from 130 kPa to 148 kPa). Alternatively, the damper control module 308 may determine the second pressure based on vehicle operating conditions such as engine speed and/or vehicle speed. In one example, the damper control module 308 adjusts the second pressure to one of a plurality of values (e.g., greater than two values) based on the vehicle operating conditions.

The damper control module 308 may adjust the second pressure to provide a sufficient amount of hysteresis torque to effectively dampen chuggle, but not so much hysteresis torque that gear rattle (or driveline growl) becomes an issue. Chuggle is a high-frequency driveline disturbance due to engine torque disturbances caused by engine firing pulses or cylinder misfires, such as may occur during an engine start. Gear rattle is a low-frequency vibration transmitted from an engine to a driveline when, for example, a torque converter clutch is locked due to high levels of hysteresis torque generated in the torque converter clutch.

The damper control module 308 may adjust the damper bypass clutch 126 between a fully engaged state and a partially engaged state when controlling the damper bypass clutch 126 in the damper assembly 104. However, in contrast to the damper assembly 104, the damper assembly 250 includes the Belleville spring 252 that generates a friction torque even when the damper bypass clutch 126 is fully disengaged. Thus, when controlling the damper bypass clutch 126 in the damper assembly 250, the damper control module 308 may adjust the damper bypass clutch 126 between the fully engaged state and a fully disengaged state. Therefore, when controlling the damper bypass clutch 126 in the damper assembly 250, the damper control module 308 may adjust the second pressure to zero.

The shift control module 310 shifts the transmission 110 by controlling the gears 130 of the transmission 110 and controlling the transmission clutch 132 of the transmission 110. In one example, the shift control module 310 initiates a shift by engaging the transmission clutch 132 to decouple the transmission 110 from the engine 102. The shift control module 310 may then disengage one of the gears 130 from the driveline 112 and engage another one of the gears 130 with the driveline 112. The shift control module 310 may then disengages the transmission clutch 132 to recouple the transmission 110 to the engine 102 and thereby complete the shift.

Figure 9:
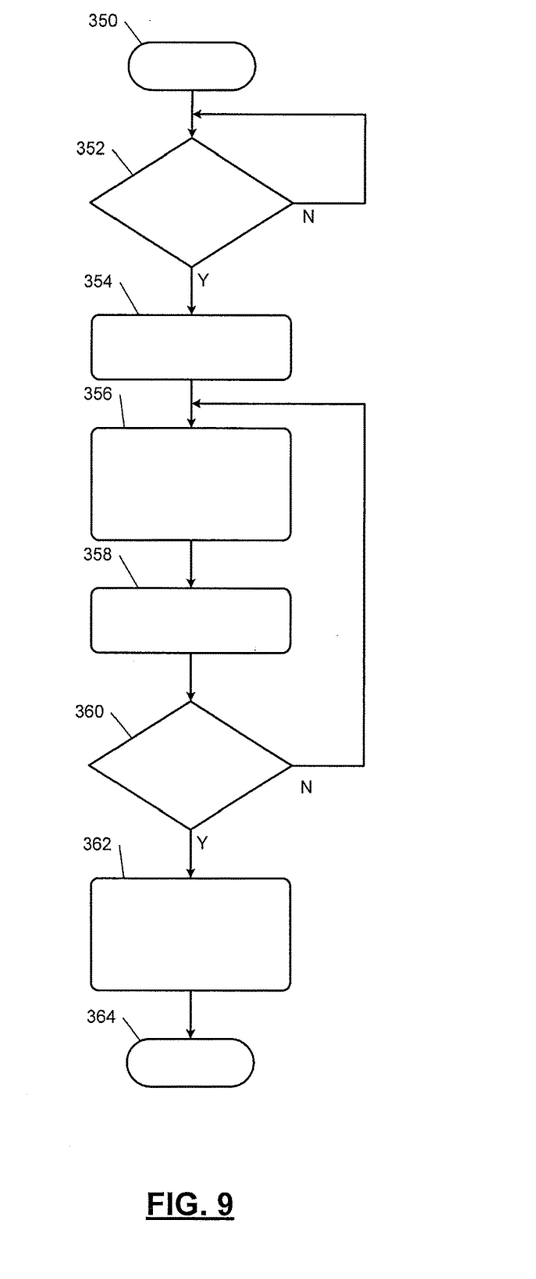
FIG. 9 is a flowchart illustrating an example transmission control method according to the principles of the present disclosure.

Referring now to FIG. 9, an example method for controlling the damper bypass clutch 226 to provide friction damping in the connection between the engine 102 and the transmission 110 begins at 350. The method is described in the context of the modules included in the example implementation of the TCM 176 shown in FIG. 8. However, the particular modules that perform the steps of the method may be different than those mentioned below and/or the method may be implemented apart from the modules of FIG. 8.

At 352, the engine start module 302 determines whether a command to start the engine 102 is generated. If an engine start command is generated, the method continues at 354. Otherwise, the engine start module 302 continues to determine whether a command to start the engine 102 is generated.

At 354, the motor control module 306 controls the electric motor 128 of the transmission 110 to start the engine 102. At 356, the damper control module 308 controls the clutch control valve 106 to supply hydraulic fluid at the first pressure to the damper piston 240. In doing so, the damper control module 308 controls the damper piston 240 to apply the first force to the first friction plate 222 to fully engage the damper bypass clutch 126 and thereby fully bypass the damper 124.

At 358, the engine speed module 304 determines the speed of the engine 102. At 360, the damper control module 308 determines whether the engine speed is greater than or equal to the first speed. If the engine speed is greater than or equal to the first speed, the method continues at 362. Otherwise, the method continues at 356.

At 362, the damper control module 308 controls the clutch control valve 106 to supply hydraulic fluid at the second pressure to the damper piston 240. In doing so, the damper control module 308 controls the damper piston 240 to apply the second force to the first friction plate 222 to partially engage the damper bypass clutch 126 and thereby partially bypass the damper 124. The method ends at 364.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
an engine speed module configured to determine a speed of an engine;
a damper control module configured to:

fully engage a damper bypass clutch of a damper assembly to fully bypass a damper of the damper assembly when the engine is starting and the engine speed is less than a first speed; and partially engage the damper bypass clutch to partially bypass the damper when the engine speed is greater than or equal to the first speed, wherein:

the engine is connected to a transmission through the damper when the damper bypass clutch is at least partially disengaged; and the damper bypass clutch connects the engine and the transmission to one another independent of the damper when the damper bypass clutch is fully engaged.

2. The system of claim 1 wherein the damper control module is configured to:

fully engage the damper bypass clutch by applying a first force to a friction plate of the damper bypass clutch; and partially engage the damper bypass clutch by applying a second force to the friction plate, wherein the second force is less than the first force and greater than zero.

3. The system of claim 2 wherein the damper control module is configured to supply fluid at a first pressure to a damper piston of the damper bypass clutch to cause the damper piston to apply the first force to the friction plate.

4. The system of claim 3 wherein:

the damper control module is configured to supply fluid at a second pressure to the damper piston of the damper bypass clutch to cause the damper piston to apply the second force to the friction plate; and the second pressure is less than the first pressure.

5. The system of claim 4 wherein the second pressure is greater than zero.

6. The system of claim 4 further comprising the damper assembly, wherein:

the second pressure is equal to zero; and the damper assembly includes an input drive plate connected to the engine, a spring retainer plate connected to the transmission, and a spring that applies a biasing force between the input drive plate and the spring retainer plate to at least partially bypass the damper.

7. The system of claim 4 wherein the damper control module is configured to determine the second pressure based on a vehicle operating condition.

8. The system of claim 4 further comprising:

the damper bypass clutch; and a control valve that controls the pressure of fluid supplied to the damper piston of the damper bypass clutch, wherein the control valve has a first port in fluid communication with a first fluid line at the first pressure, a second port in fluid communication with a second fluid line at the second pressure, and a third port in fluid communication with a fluid supply line that supplies fluid to the damper piston.

9. The system of claim 4 further comprising:

the damper bypass clutch; and a control valve that controls the pressure of fluid supplied to the damper piston of the damper bypass clutch, wherein the damper control module is configured to control the control valve to adjust the pressure of fluid supplied to the damper piston to N values at N different times, wherein N is an integer greater than two.

10. The system of claim 1 wherein the damper control module is configured to:

fully engage the damper bypass clutch when a command to start the engine is generated; and continue to fully engage the damper bypass clutch while the engine speed is less than the first speed.

11. A method comprising:

determining a speed of an engine;

fully engaging a damper bypass clutch of a damper assembly to fully bypass a damper of the damper assembly when the engine is starting and the engine speed is less than a first speed; and partially engaging the damper bypass clutch to partially bypass the damper when the engine speed is greater than or equal to the first speed, wherein:

the engine is connected to a transmission through the damper when the damper bypass clutch is at least partially disengaged; and the damper bypass clutch connects the engine and the transmission to one another independent of the damper when the damper bypass clutch is fully engaged.

12. The method of claim 11 further comprising:

fully engaging the damper bypass clutch by applying a first force to a friction plate of the damper bypass clutch; and partially engaging the damper bypass clutch by applying a second force to the friction plate, wherein the second force is less than the first force and greater than zero.

13. The method of claim 12 further comprising supplying fluid at a first pressure to a damper piston of the damper bypass clutch to cause the damper piston to apply the first force to the friction plate.

14. The method of claim 13 further comprising supplying fluid at a second pressure to the damper piston of the damper bypass clutch to cause the damper piston to apply the second force to the friction plate, wherein the second pressure is less than the first pressure.

15. The method of claim 14 wherein the second pressure is greater than zero.

16. The method of claim 14 wherein:

the second pressure is equal to zero; and the damper assembly includes an input drive plate connected to the engine, a spring retainer plate connected to the transmission, and a spring that applies a biasing force between the input drive plate and the spring retainer plate to at least partially bypass the damper.

17. The method of claim 14 further comprising determining the second pressure based on a vehicle operating condition.

18. The method of claim 14 further comprising:

placing a first fluid line at the first pressure in fluid communication with a fluid supply line for the damper piston at a first time; and placing a second fluid line at the second pressure in fluid communication with the fluid supply line for the damper piston at a second time that is different than the first time.

19. The method of claim 14 further comprising adjusting the pressure of fluid supplied to the damper piston to N values at N different times, wherein N is an integer greater than two.

20. The method of claim 11 further comprising:

fully engaging the damper bypass clutch when a command to start the engine is generated; and continuing to fully engage the damper bypass clutch while the engine speed is less than the first speed.

* * * * *